April 25, 1933.  P. S. EDWARDS ET AL  1,905,348
DIRECT READING OHMMETER
Filed June 7, 1929
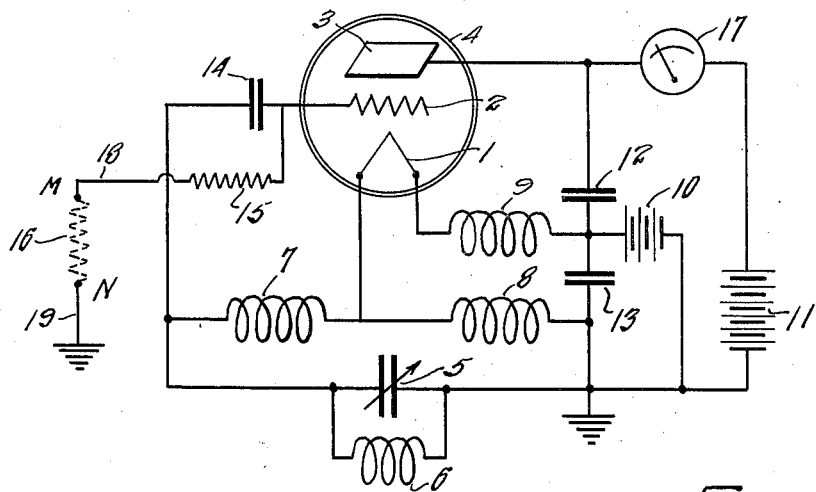
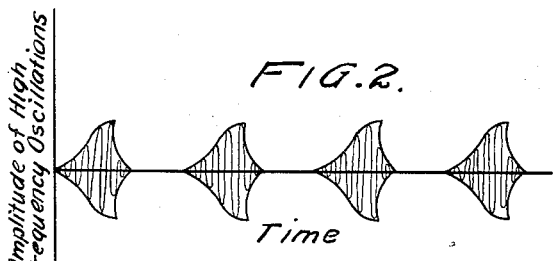
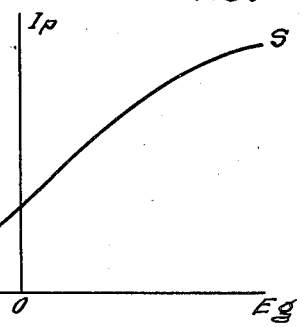
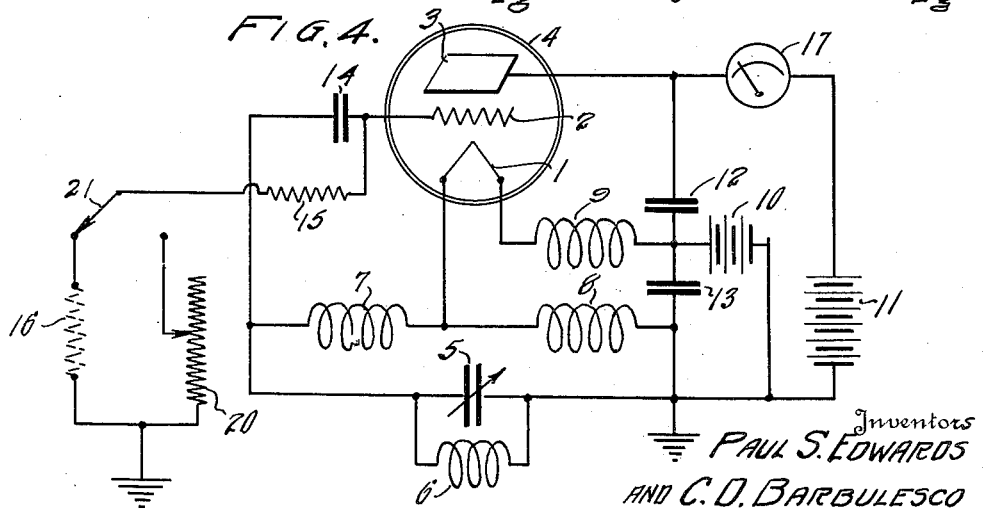
Inventors
PAUL S. EDWARDS
AND C. O. BARBULESCO
By Semmes & Semmes
Attorneys Patented Apr. 25, 1933

1,905,348

UNITED STATES PATENT OFFICE

PAUL S. EDWARDS AND CONSTANTIN D. BARBULESCO, OF DAYTON, OHIO

DIRECT READING OHMMETER

Application filed June 7, 1929. Serial No. 369,231.

(GRANTED UNDER THE ACT OF MARCH 3, 1883, AS AMENDED APRIL 30, 1928; 370 O. G. 757)

The invention described herein, if patented, may be manufactured and used by and for the Government for governmental purposes without the payment to us of any royalty thereon.

This invention relates in general to electrical measuring devices and more particularly to a means of measuring ohmic resistance directly upon an indicating instrument.

It is known that precision measurements of ohmic resistance involves the utilization of a rather complicated bridge arrangement. Such methods require careful adjustments and a final computation of the result as derived from the reading of different values.

The major object of the present invention is to devise a mechanism which permits the determination of an unknown resistance by the simple substitution in a circuit and the reading of the resistance directly.

Another object is to provide an instrument of the class described in which the result may be read directly in ohms.

A further object is to provide a device of the character described in which the true resistance value of a given resistance may be quickly and immediately indicated without resorting to mathematical computations.

A further object is to provide a device of the character described in which the measurement can be made in either direct current or in alternating currents of low or high frequency.

In order to more clearly explain the principles of the invention the preferred mechanical embodiments of it are shown in the accompanying drawing in which:

Fig. 1 is a diagrammatic illustration of the general circuit employed for the described purposes.

Fig. 2 is a diagrammatic illustration of the operation of certain portions of the circuit.

Fig. 3 is a schematic illustration of the plate current characteristic of the thermionic tube.

Fig. 4 is a modified form of circuit.

The present invention is a continuation in part of application Serial No. 305,753, filed September 13, 1928.

The enumerated and other equally important objects are effectuated by utilizing a circuit of great sensitivity and faithful reponse in conjunction with the resistance whose value is to be measured.

As shown in Fig. 1, the instrument comprises a vacuum tube comprehending the filament 1, grid 2 and plate 3. These are enclosed in an evacuated container 4 in the usual manner. Coupled to the tube is a low loss circuit comprising a large capacity 5 and a small inductance 6. As explained in the application above referred to, this circuit embodying capacity 5 and inductance 6, known as the low loss tank circuit, largely controls the frequency at which the tube oscillates.

Connected to the filament 1 are the high frequency choke coils 7 and 8. These preferably are comprised of a relatively large number of turns of wire and are respectively included in the grid and plate circuits of a tube. These choke coils induce two driving electromotive forces substantially 180° out of phase. The choke coil 9 is similar to coil 8 and serves to maintain the filament 1 at a high potential with respect to the ground. The geometric sum of the electromotive forces produced by the choke coils maintains a heavy oscillating current in the tank circuit. The power supply comprises a filament battery 10 and a plate battery 11, both of which are maintained at ground potential. The numerals 12 and 13 indicate bypass condensers of large value for the high frequency currents which circulate in the plate circuit.

As explained in the copending application above referred to, the frequency of the oscillations is controlled mainly by the value of the condenser 5 and inductance 6. Inasmuch as the condenser is very large the interelectrode capacity of the tube becomes substantially negligible in effect and hence replacements of the tube or variations of the characteristics of a given tube during its normal life will not appreciably effect the frequency of the oscillations generated.

Positioned in the grid circuit is a blocking condenser 14 and a leak resistance 15. Connected in series with the resistance 15 is an unknown resistance 16, which in the present use of the instrument constitutes the resistance which is to be measured. The value of the condenser 14 and the resistance 15 are so chosen that high frequency oscillations will periodically charge the condenser up to a certain value. After attainment of this value the condenser discharges through the leak resistance to the ground. The condenser 14 and resistance 15, together with any additional coupled resistance, produce a periodic interruption of the high frequency oscillations. The period of the parasitic discharge is controlled by the time constant $C(R+Rx)$, where C is the capacity of the element 14, R the resistance of element 15 and $Rx$ the resistance of the element to be tested. By choosing or regulating the values of the blocking condenser and the resistance the period of the parasitic discharge may be made to vary from a few cycles per second to several thousand cycles or more.

The effect or functioning of the blocking condenser and leak resistance is indicated schematically in Fig. 2 in which the shape of the modulated high frequency oscillation is shown. The periodic charge and discharge of the blocking condenser is indicated by the envelope of the amplitudes of the high frequency oscillations. As noted above, the frequency of this periodic charge and discharge depends upon the values of the condenser and leak resistance, assuming the other values of the circuit to be constant. Thus for a given large value of the grid leak the frequency is low and the grid of the tube is strongly biased. The resultant plate current consequently is very small and will remain at this low value until some external or extraneous cause is made to affect the circuit.

On the other hand, a decrease in the value of the grid resistance will tend to increase the frequency of the periodic or parasitic discharge and, since the amplitude of the high frequency oscillations cannot reach high values, the grid bias decreases. This, as is known, effects an increase of the plate current. Similarly a decrease in the value of the blocking condenser 14 will have the same effect. In short, the effect of the chopping of the high frequency oscillations is to produce a strong negative bias on the grid of the oscilating tube.

In other words, as shown in Fig. 3, the operating point is automatically shifted on the static characteristic of the tube towards the negative values of the grid voltage $(-E_g)$ and consequently the plate current drops to a low negligible value. In Fig. 3 the operating point $a$ indicates a plate current A which is very small in value as compared with the saturation current of the tube.

It will be seen, from inspection of Fig. 3, that the decrease in the value of the resistance connecting the grid with the ground is always accompanied by a displacement of the point $a$ toward the saturation point S. In other words this displacement is followed by an increase in the value of the plate current and at the same time by an increase in the frequency of the periodic charges and discharges of the blocking condenser. The duration of a complete charge and discharge therefore being small, the amplitude of high frequency oscillations cannot reach high values and the biasing effect is reduced. As a result the plate current is increased.

It will now be appreciated that if a known resistance or resistances, from very small to very large values, is introduced between the points M and N, the direct current indicating meter 17 can be calibrated to read directly in ohms. After such initial calibration any unknown resistance which is interposed, at 16, can thereafter be measured in a very short time by reading its value directly from the meter 17. To do this it is only necessary to provide the conductors 18 and 19 with suitable terminals for connection to the resistance to be tested.

It will be understood also that the described circuit may be utilized to measure an unknown resistance in other ways. Thus if the meter 17 is not initially calibrated in terms of ohmic resistance, the same result can be accomplished by interposing a resistance box 20 in the circuit. This, as will be appreciated, permits the use of a standard instrument at 17 in place of one having a dial calibrated specially as indicated above. The resistance box 20 may be of any known type. This is connected by a single pole double throw switch 21. The operation of this type of instrument will have been appreciated from the foregoing description. The unknown resistance 16 is first connected in the input and a reading taken on meter 17. The switch is then contacted with a terminal plug on the resistance box and is shifted until the resultant value, as indicated in the meter 17, corresponds to the value as determined for the unknown resistance. The value indicated by the reading on the resistance box is then equal to the value of the unknown resistance. This substitution method is, as will be appreciated, substantially independent of the constancy of the circuit due to the emmission of the filament, increase of internal resistance or of batteries and other causes.

It will now be appreciated that we have provided a device in which the value of an unknown resistance may be quickly and accurately determined merely by the interposition of the resistance to be tested in a given circuit. The circuit is of great sensitivity and highly susceptible to relatively small changes in resistance, and hence insures an accurate and precise determination. The device, as explained, may be made up so as to include a specially calibrated dial, as in the case of the unit illustrated in Fig. 1, or may be made up of standard parts including the current meter 17 and the resistance box 20.

While preferred embodiments of the invention have been described it is to be understood that these are given merely as examples of the underlying principles of the invention, and since these may be incorporated in other specific mechanical structures we do not intend to be limited to those shown except as such limitations are clearly imposed by the appended claims.

We claim:

1. An ohmmeter comprising a self-modulated oscillator including a vacuum tube and an associated low loss tank circuit, a resistance connected in the grid circuit of the tube and a current meter connected in the plate circuit of the tube and responsive to changes in the value of said resistance.

2. An ohmmeter comprising a vacuum tube and a low loss tank circuit coupled to the input circuit of the tube, means to modulate the high frequency at audible frequency including a blocking condenser and leak resistance connected to the grid, and a current meter connected in the plate circuit, calibrated in ohms and adapted to indicate directly the variations in ohmic resistance in the grid circuit.

3. An ohmmeter comprising a vacuum tube, a tank circuit including a large capacitance and small inductance connected to the input of the tube, a blocking condenser connected in the grid circuit, a resistance leak associated with the condenser, means to connect an unknown resistance in series with the resistance leak and means, in the plate circuit, to measure the value of the unknown resistance.

4. An ohmmeter comprising a vacuum tube having a filament, grid and plate, a low oscillating circuit of small inductance and large capacitance connected across the grid and plate, a plurality of radio frequency choke coils connected between the filament and the grid on one side and the filament and plate on the other side producing across the oscillating circuit a driving electromotive force, a resistance connected in the grid circuit of the tube and a current meter connected in the plate circuit of the tube responsive to changes in the value of the resistance.

5. An ohmmeter comprising a vacuum tube having a filament, grid and plate, a tank circuit comprising a low inductance, large capacitance and low losses connected across the grid and plate, a coil between the filament and grid and a second coil between the filament and the plate of the tube, a resistance connected to the input circuit of the tube and a current meter connected to the plate circuit of the tube.

6. An ohmmeter comprising a vacuum tube having a filament, grid and plate, a low loss tank circuit comprising a low inductance and large capacitance connected across the grid and plate, means to produce high frequency oscillations in said tank circuit comprising two coils placed respectively between the filament and each of the cold electrodes of the tube, a blocking condenser and leak resistance connected to the grid and a current meter connected in the plate circuit adapted to indicate variations in ohmic resistance in the grid circuit.

7. An ohmmeter comprising a vacuum tube and a low-loss tank circuit coupled to the input of the tube, means to modulate the high frenquency at audible frequency including a blocked condenser and a leak resistance connected to the grid circuit of the tube, an unknown resistance, a variable known resistance, means to successively connect the unknown and the known resistance to the leak resistance and a meter connected in the plate circuit of the tube to indicate the same value for the known and unknown resistances.

In testimony whereof we affix our signatures.

PAUL S. EDWARDS.
CONSTANTIN D. BARBULESCO.